United States Patent
Walker et al.

(10) Patent No.: US 10,726,026 B2
(45) Date of Patent: Jul. 28, 2020

(54) DYNAMIC SUSTAINABILITY SEARCH ENGINE

(71) Applicant: ROCKWELL AUTOMATION TECHNOLOGIES, INC., Mayfield Heights, OH (US)

(72) Inventors: Marcia Elaine Walker, Durham, NC (US); Philip John Kaufman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 278 days.

(21) Appl. No.: 15/958,922

(22) Filed: Apr. 20, 2018

(65) Prior Publication Data
US 2018/0239764 A1    Aug. 23, 2018

Related U.S. Application Data

(63) Continuation of application No. 14/532,673, filed on Nov. 4, 2014, now abandoned, which is a
(Continued)

(51) Int. Cl.
*G06F 16/2457* (2019.01)
*G06F 16/951* (2019.01)
(Continued)

(52) U.S. Cl.
CPC .... *G06F 16/24578* (2019.01); *G06F 16/2428* (2019.01); *G06F 16/951* (2019.01); *G06F 16/9535* (2019.01); *G06Q 30/02* (2013.01)

(58) Field of Classification Search
CPC .............. G06F 16/24578; G06Q 10/06; G06Q 10/0639; G06Q 30/02
See application file for complete search history.

(56) References Cited

U.S. PATENT DOCUMENTS

| 4,039,392 A | 8/1977 | Singh |
|---|---|---|
| 4,300,125 A | 11/1981 | Loshing et al. |

(Continued)

FOREIGN PATENT DOCUMENTS

| EP | 0977137 A2 | 2/2000 |
|---|---|---|
| WO | WO2004074954 A2 | 9/2004 |
| WO | WO2008011427 A2 | 1/2008 |

OTHER PUBLICATIONS

Kiritsis D, et al., Research issues on product lifecycle management and information tracking using smart embedded systems. Advanced Engineering Informatics, Elsevier Lnkd—DOI:10.1016/J, AEI2004. 09.005, vol. 17, No. 3-4, Jul. 1, 2003, pp. 189-202, XP004595481 ISSN: 1474-0346.

(Continued)

*Primary Examiner* — Etienne P Leroux
(74) *Attorney, Agent, or Firm* — Fletcher Yoder, P.C.

(57) ABSTRACT

The innovation relates to systems and/or methodologies for facilitating dynamic sustainability searches. A sustainability search component executes a query, and returns one or more results that satisfy a set of search criteria and a set of sustainability factors. The search criteria can include keywords, such as product types, process types, and additional features related to the keywords, such as price, location, brand, and so forth. The sustainability factors are alternative cost measures for a given process, product, or plant element. The sustainability search component can analyze the returned results, and rank the results based on sustainability.

20 Claims, 9 Drawing Sheets

Related U.S. Application Data continuation of application No. 12/429,830, filed on Apr. 24, 2009, now Pat. No. 8,892,540.

(51) Int. Cl.
  *G06F 16/242* (2019.01)
  *G06F 16/9535* (2019.01)
  *G06Q 30/02* (2012.01)

(56) References Cited

U.S. PATENT DOCUMENTS

| | | |
|---|---|---|
| 4,341,345 A | 7/1982 | Hammer et al. |
| 4,383,298 A | 5/1983 | Huff et al. |
| 4,624,685 A | 11/1986 | Lueckenotte et al. |
| 4,827,395 A | 5/1989 | Anders et al. |
| 5,043,929 A | 8/1991 | Kramer et al. |
| 5,202,996 A | 4/1993 | Sugino et al. |
| 5,251,205 A | 10/1993 | Callon et al. |
| 5,297,057 A | 3/1994 | Kramer et al. |
| 5,646,862 A | 7/1997 | Jolliffe et al. |
| 5,736,983 A | 4/1998 | Nakajima et al. |
| 5,822,207 A | 10/1998 | Hazama et al. |
| 5,924,486 A | 7/1999 | Ehlers et al. |
| 5,983,622 A | 11/1999 | Newburry et al. |
| 6,012,053 A | 1/2000 | Pant et al. |
| 6,015,783 A | 1/2000 | Von der Osten et al. |
| 6,076,108 A | 6/2000 | Courts et al. |
| 6,263,255 B1 | 7/2001 | Tan et al. |
| 6,281,784 B1 | 8/2001 | Redgate et al. |
| 6,289,252 B1 | 9/2001 | Wilson et al. |
| 6,321,983 B1 | 11/2001 | Katayanagi et al. |
| 6,473,893 B1 | 10/2002 | Kay et al. |
| 6,507,774 B1 | 1/2003 | Reifman et al. |
| 6,633,823 B2 | 10/2003 | Bartone et al. |
| 6,701,298 B1 | 3/2004 | Jutsen |
| 6,732,055 B2 | 5/2004 | Bagepalli et al. |
| 6,747,368 B2 | 6/2004 | Jarrett, Jr. |
| 6,785,592 B1 | 8/2004 | Smith et al. |
| 6,857,020 B1 | 2/2005 | Chaar et al. |
| 6,859,755 B2 | 2/2005 | Eryurek et al. |
| 7,043,316 B2 | 5/2006 | Farchmin et al. |
| 7,274,975 B2 | 9/2007 | Miller |
| 7,277,864 B2 | 10/2007 | Ohnemus et al. |
| 7,409,303 B2 | 8/2008 | Yeo et al. |
| 7,451,019 B2 | 11/2008 | Rodgers |
| 7,477,956 B2 | 1/2009 | Huang et al. |
| 7,531,254 B2 | 5/2009 | Hibbs et al. |
| 7,565,351 B1 | 7/2009 | Callaghan |
| 7,587,251 B2 | 9/2009 | Hopsecger |
| 7,747,416 B2 | 6/2010 | Deininger et al. |
| 7,788,189 B2 | 8/2010 | Budike, Jr. |
| 8,010,523 B2 | 8/2011 | Djabarov |
| 8,068,938 B2 | 11/2011 | Fujita |
| 8,271,363 B2 | 9/2012 | Branscomb |
| 8,892,540 B2 | 11/2014 | Walker et al. |
| 2001/0011368 A1 | 8/2001 | Graser et al. |
| 2002/0013744 A1 | 1/2002 | Tsunenari et al. |
| 2002/0026343 A1 | 2/2002 | Duenke |
| 2002/0052666 A1 | 5/2002 | Fukatsu et al. |
| 2002/0066072 A1 | 5/2002 | Crevatin |
| 2002/0099464 A1 | 7/2002 | O'Connor et al. |
| 2002/0099804 A1 | 7/2002 | O'Connor et al. |
| 2002/0116239 A1 | 8/2002 | Reinsma et al. |
| 2002/0128933 A1 | 9/2002 | Day et al. |
| 2002/0168621 A1 | 11/2002 | Cook et al. |
| 2002/0169582 A1 | 11/2002 | Eryurek et al. |
| 2002/0178047 A1 | 11/2002 | Or et al. |
| 2002/0198755 A1 | 12/2002 | Birkner et al. |
| 2003/0014500 A1 | 1/2003 | Schleiss |
| 2003/0028527 A1 | 2/2003 | Crosby et al. |
| 2003/0061091 A1 | 3/2003 | Amaratunga et al. |
| 2003/0088370 A1 | 5/2003 | Bagepalli et al. |
| 2003/0110065 A1 | 6/2003 | Twigge-Molecey |
| 2003/0110369 A1 | 6/2003 | Fish et al. |
| 2003/0171851 A1 | 9/2003 | Brickfield et al. |
| 2003/0221119 A1 | 11/2003 | Geiger et al. |
| 2004/0088119 A1 | 5/2004 | Landgraf |
| 2004/0107345 A1 | 6/2004 | Brandt et al. |
| 2004/0117240 A1 | 6/2004 | Ness et al. |
| 2004/0143467 A1 | 7/2004 | McAllister et al. |
| 2004/0158506 A1 | 8/2004 | Wille |
| 2004/0199294 A1 | 10/2004 | Fairlie et al. |
| 2004/0205412 A1 | 10/2004 | Staron et al. |
| 2004/0249697 A1 | 12/2004 | Ohnemus et al. |
| 2004/0260489 A1 | 12/2004 | Mansingh et al. |
| 2004/0261673 A1 | 12/2004 | Allen et al. |
| 2005/0015287 A1 | 1/2005 | Beaver |
| 2005/0034023 A1 | 2/2005 | Maturana et al. |
| 2005/0065971 A1 | 3/2005 | Honda |
| 2005/0143865 A1 | 6/2005 | Gardner |
| 2005/0144154 A1 | 6/2005 | DeMesa et al. |
| 2005/0171910 A1 | 8/2005 | Wu et al. |
| 2005/0198241 A1 | 9/2005 | Pavlik et al. |
| 2005/0198333 A1 | 9/2005 | Dinges |
| 2005/0234904 A1 | 10/2005 | Brill et al. |
| 2005/0278296 A1 | 12/2005 | Bostwick |
| 2006/0026145 A1 | 2/2006 | Beringer et al. |
| 2006/0248002 A1 | 11/2006 | Summer et al. |
| 2007/0038646 A1 | 2/2007 | Thota |
| 2007/0073750 A1 | 3/2007 | Chand et al. |
| 2007/0078736 A1 | 4/2007 | Chand et al. |
| 2007/0168213 A1 | 7/2007 | Comrie |
| 2007/0226068 A1 | 9/2007 | Keil et al. |
| 2007/0283030 A1 | 12/2007 | Deininger et al. |
| 2008/0015975 A1 | 1/2008 | Ivchenko et al. |
| 2008/0033841 A1* | 2/2008 | Wanker ............... G06Q 30/02 705/7.32 |
| 2008/0046387 A1 | 2/2008 | Gopal et al. |
| 2008/0046407 A1 | 2/2008 | Shah et al. |
| 2008/0059457 A1 | 3/2008 | Ohnemus et al. |
| 2008/0059897 A1 | 3/2008 | Dilorenzo |
| 2008/0079560 A1 | 4/2008 | Hall et al. |
| 2008/0127779 A1 | 6/2008 | Morales Cerda et al. |
| 2008/0154749 A1 | 6/2008 | D'hooghe et al. |
| 2008/0255889 A1 | 10/2008 | Geisler et al. |
| 2008/0270272 A1 | 10/2008 | Branscomb |
| 2008/0272934 A1 | 11/2008 | Wang et al. |
| 2008/0319812 A1 | 12/2008 | Sousa et al. |
| 2009/0083843 A1 | 3/2009 | Wilkinson, Jr. et al. |
| 2009/0099887 A1 | 4/2009 | Sklar et al. |
| 2009/0100159 A1 | 4/2009 | Extra |
| 2009/0132176 A1 | 5/2009 | McConnell et al. |
| 2009/0138415 A1 | 5/2009 | Lancaster |
| 2009/0177505 A1 | 7/2009 | Dietrich et al. |
| 2009/0222307 A1 | 9/2009 | Beaver |
| 2009/0281674 A1 | 11/2009 | Taft |
| 2009/0281677 A1 | 11/2009 | Botich et al. |
| 2009/0313164 A1 | 12/2009 | Hoglund |
| 2009/0319315 A1 | 12/2009 | Branscomb |
| 2010/0023360 A1 | 1/2010 | Nadhan |
| 2010/0030601 A1 | 2/2010 | Warther et al. |
| 2010/0042455 A1 | 2/2010 | Liu et al. |
| 2010/0057480 A1 | 3/2010 | Arfin et al. |
| 2010/0088136 A1 | 4/2010 | Cheng et al. |
| 2010/0100402 A1* | 4/2010 | Shah ..................... G06Q 10/06 705/400 |
| 2010/0100405 A1 | 4/2010 | Lepore et al. |
| 2010/0131343 A1 | 5/2010 | Hamilton |
| 2010/0138003 A1 | 6/2010 | August et al. |
| 2010/0138279 A1* | 6/2010 | Cohen ............... G06Q 10/0639 705/7.38 |
| 2010/0217642 A1 | 8/2010 | Crabtree et al. |
| 2010/0217651 A1 | 8/2010 | Crabtree et al. |
| 2010/0218108 A1 | 8/2010 | Crabtree et al. |
| 2010/0249975 A1 | 9/2010 | Rezayat |
| 2010/0262445 A1 | 10/2010 | DeSorbo |
| 2010/0274367 A1 | 10/2010 | Kaufman et al. |
| 2010/0274377 A1 | 10/2010 | Kaufman et al. |
| 2010/0274602 A1 | 10/2010 | Kaufman et al. |
| 2010/0274603 A1 | 10/2010 | Walker et al. |
| 2010/0274611 A1 | 10/2010 | Kaufman et al. |
| 2010/0274612 A1 | 10/2010 | Walker et al. |
| 2010/0274629 A1 | 10/2010 | Walker et al. |
| 2010/0275147 A1 | 10/2010 | Kaufman et al. |

(56) References Cited

U.S. PATENT DOCUMENTS

| | | |
|---|---|---|
| 2010/0292856 A1 | 11/2010 | Fujita |
| 2010/0314940 A1 | 12/2010 | Palmer et al. |
| 2010/0318233 A1 | 12/2010 | Yunes et al. |
| 2010/0332373 A1 | 12/2010 | Crabtree et al. |
| 2011/0046800 A1 | 2/2011 | Imes et al. |
| 2011/0071721 A1 | 3/2011 | Gilfillan et al. |
| 2011/0172838 A1 | 7/2011 | Pai et al. |
| 2011/0273022 A1 | 11/2011 | Dennis et al. |
| 2013/0096727 A1 | 4/2013 | Brandt |

OTHER PUBLICATIONS

Dillenburg, S. et al., "Aproaching socially responsible investment with a comprehensive ratings scheme: total social impact," Journal of Business Ethics 43.3 (2003): 167-177.

GE Energy, "Energy and Asset Performance—Fact Sheet" Sep. 2005, General Electric Company, Published online at [http://www.gepower.com/prod_serv/serv/industrial_service/en/downloads/gea14163_eap.pdf], retrieved Apr. 13, 2009, 2 pages.

Jawahir, I.S., et al, "Total life-cycle considerations in product design for sustainability: A framework for comprehensive evaluation," Proc. 10$^{th}$ Int. Research/Expert Conf. (TMT 2006), Barcelona, Spain, 2006.

Yang, et al., "Eco-Design for Product Lifecycle Sustainability", IEEE International Conference on Industrial Informatics, 2006, pp. 548-553.

Y-S Ma et al., Product Lifecycle Analysis and Optimization in an Eco-value Based, Sustainable and Unified Approach. Industrial Informatics, 2006 IEEE International Conference on, IEEE, Pl. Aug. 1, 2006, pp. 537-541 XP031003409, ISBN: 978-0-7803-9700-2.

Abb. "Energy Management Solution for the Process Industry—Energy Management and Optimization." Apr. 6, 2007, Published online at [http://library.abb.com/global/scot/scot313.nsf/veritydisplay/5e48efb88a7e1cbac125734600737b02/$File/3BF1405000R4001_en_Energy_Management_and_Optimization_3.5.pdf], retrieved Apr. 13, 2009. 12 pages.

Seref Erkayhan Ed—Ding Zhen-Hua et al., The Use of RFID enables a holistic information management within Product Lifecycle Management (PLM). RFID Eurasia, 2007 1$^{st}$ Annual, IEEE, Pl Sep. 1, 2007, pp. 1-4, XP031153342. ISBN: 978-975-01-5660-1.

EPO: Notice from European Patent Office dated Oct. 1, 2007 concerning business methods. Official.

Journal of the European Patent Office, vol. 30, No. 11, dated Nov. 1, 2007, pp. 592-593.

Kennedy, Pat, et al., "In Pursuit of the Perfect Plant—A Business and Technical Guide", Apr. 2008, Chapter 9—Energy Management, pp. 251-283; published by Evolved Technologist Press, New York, New York, USA.

Kouloura, et al., "A Systems Approach to Corporate Sustainability in Energy Management of Industrial Units", IEEE Systems Journal, vol. 2, No. 4, Dec. 2008, pp. 442-452.

Abb, "Energy Management and Optimization for the Process Industries—Advanced IT Tools for Planning, Monitoring, Controlling, and Reporting Energy System Operations." Published online at [http://library.abb.com/global/scot/scot296.nsf/veritydisplay/bd2a898a24267c46c12571c70070a851/$File/3BF1402000R3001_en_Advanced_IT_Tools_for_Energy_Management.pdf], retrieved Apr. 13, 2009, 6 pages.

European Search Report for European Application No. 10160810, dated Aug. 6, 2010, 2 pgs.

European Search Report for European Application No. 10160649. 9-1238 dated Sep. 23, 2010, 8 pgs.

European Search Report for European Application No. 10160581. 4-1238 dated Sep. 23, 2010, 8 pgs.

European Search Report for European Application No. 10160673. 9-1238 dated Sep. 23, 2010, 9 pgs.

European Search Report for European Application No. 10160811.5 dated Sep. 20, 2010, 9 pgs.

European Search Report for European Application No. 10160737, dated Nov. 4, 2010, 9 pages.

European Search Report for European Application No. 101605855-1527 / 2254061 dated Dec. 20, 2010, 9 pages.

Dietmair, A., "Energy Consumption Modeling and Optimization for Production Machines," ICSET 2008, pp. 574-579.

File History for U.S. Appl. No. 12/429,813 as of Oct. 20, 2014.

Jayal, A.D. et al., "Sustainable manufacturing: Modeling and optimization challenges at the product, process and system levels, CIRP Journal of Manufacturing Science and Technology," vol. 2, Issue 3, 2010, pp. 144-152, ISSN 1755-5817.

* cited by examiner

DYNAMIC SUSTAINABILITY SEARCH ENGINE

CROSS REFERENCE TO RELATED APPLICATION

This application is a continuation of U.S. patent application Ser. No. 14/532,673, which was filed on Nov. 4, 2014, entitled "DYNAMIC SUSTAINABILITY SEARCH ENGINE", which is a continuation of U.S. patent application Ser. No. 12/429,830, which was filed on Apr. 24, 2009, and issued as U.S. Pat. No. 8,892,540 on Nov. 18, 2014, entitled "DYNAMIC SUSTAINABILITY SEARCH ENGINE", each of which is incorporated herein by reference in their entirety.

TECHNICAL FIELD

The subject innovation relates generally to sustainability enhancements, and more particularly to systems and/or methodologies for a dynamic sustainability search engine.

BACKGROUND

Consumers, manufacturers, and retailers are becoming increasingly interested in environmental and socio-environmental concerns, such as recycling, child labor practices, reducing greenhouse gas emissions, improving energy demand, and so forth. In addition, the current economic climate is making "green" solutions ever more attractive, particularly those with the potential to decrease cost or increase profitability. However, access to information regarding a number of these issues can be difficult to locate, assuming that said information is even readily available.

A variety of current approaches focus on broadly defining products or processes as "green", conflict-free, environmentally friendly, etc. For example, a number of products are marked with seals that intend to confer to prospective purchasers that the products are somehow more ecologically friendly than comparable products. Similarly, a number of certifications are available in various areas, typically at an expense to the party seeking the certification. The merit of these seals and certifications can be difficult to ascertain, because details of what they intend to convey is often unknown or unclear.

The current approaches are often only vague or ambiguous indicators of a products actual environmental or socio-environmental impact. In addition, the rating or certification systems may ignore or give undesirable weight to any number of factors that are important to different people and groups. Consequently, it would be desirable to have a dynamic technique for determining the sustainability of products, and efficiently locating information regarding said sustainability.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

Systems and methods are provided for facilitating dynamic sustainability searches. A sustainability search component executes a query, and returns one or more results that satisfy a set of search criteria and a set of sustainability factors. The search criteria can include keywords, such as product types, process types, and additional features related to the keywords, such as price, location, brand, and so forth. The sustainability factors are alternative cost measures for a given process, product, or plant element. The sustainability search component can analyze the returned data elements, and rank the data elements according to sustainability.

The sustainability can be determined based on a predetermined sustainability score, or can be determined based on weights assigned to one or more sustainability factors. The weights assigned to the sustainability factors can be predetermined, or can be determined based on one or more user preferences. The query results and rankings can be used to influence consumer purchasing, for management of industrial production, for regulatory oversight, for supply chain management, and product design. In addition, one or more interfaces can be provided to facilitate user interaction with the sustainability search component.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
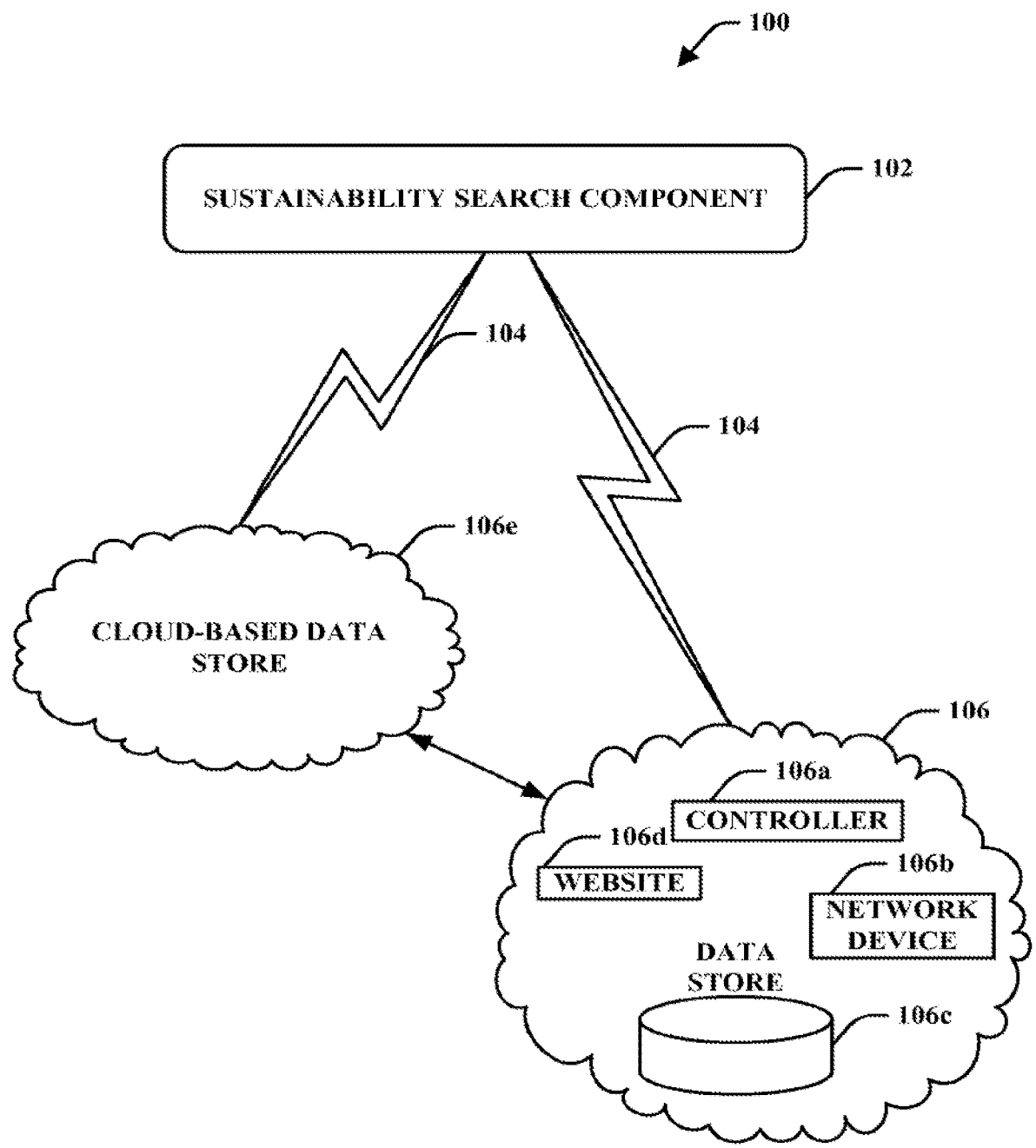
FIG. 1 is an example general component block diagram illustrating a dynamic sustainability search system in accordance with an aspect of the present specification.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are illustrated in block diagram form in order to facilitate describing the embodiments.

As used in this application, the terms "component," "system," "object," "model," "policy," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

FIG. 1 is an example general component block diagram illustrating a dynamic sustainability search system 100 in accordance with an aspect of the present innovation. The system 100 includes a sustainability search component 102 that queries one or more targets 106 (e.g., 106*a-e*) for data elements (e.g., results) satisfying a set of search criteria and sustainability factors via a communication link 104. The data elements can be product or process identifiers having one or more tags (e.g., metadata, notations, etc.) relating to the search criteria and/or sustainability factors (discussed infra). Additionally or alternatively, the data elements can be websites, articles, database entries, bills of materials (B.O.M), specifications, and so forth. The targets 106 can include but are not limited to controllers 106*a*, network devices 106*b*, data stores 106*c*, websites 106*d*, and so forth. Data elements can be locally stored by the targets 106, or remotely stored, such as in a server, distributed network of data stores, and so forth.

Additionally or alternatively, the targets 106 can include a cloud-based data store 106*e*. The cloud-based data store 106*e* (e.g., cloud) is illustrative of a computing infrastructure having a plurality of devices capable of communicating data and/or virtualized resources across the communication infrastructure 104 (e.g., such as the Internet). It is to be appreciated that user devices (e.g., sustainability search component 102) obtaining data or resources from the cloud 106*e* do not need to have knowledge of, expertise in, or control over the technology infrastructure contributing to or contained in the cloud 106*e*. Furthermore, the communication link 104 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth.

In operation, the sustainability search component 102 queries one or more of the targets 106 for data elements satisfying a set of search criteria and a set of sustainability factors (e.g., sustainability criteria, sustainability metrics, etc.). The search criteria can include search terms (e.g., keywords), such as product types, process types, and so forth. For example, the sustainability search component 102 can execute a query for "motors." In addition, the search criteria can include additional features of or related to the search terms, including but not limited to price, brand, location, etc. Continuing with the previous example, the search component 102 can execute a query for "motors" that have a price of less than or equal to five thousand dollars ($5000.00).

The term "sustainability factors" is intended to assess alternative cost measures for a given process, product, or plant element. The sustainability factors can be organized into categories or subgroups. For instance, the sustainability factors can be organized into at least three categories: planet, human, and financial sustainability. The planet sustainability factors can include resource consumption, such as water, air, gas, electricity, and steam (e.g., WAGES). In addition, the planet sustainability factors can include carbon emissions, recyclability (e.g., component, packaging, etc.), waste factor (e.g., product and/or process), and most any other factor that relates to the environmental impact of a product or process. The human sustainability factors, can include diversity factors (e.g., employment of minorities) for employers, training scores (e.g., skilled versus unskilled labor), union labor scores (e.g., use of union vs. non-union labor), fair labor practices, lost work day case rate (e.g., LWDCR, work related injuries and illnesses that result in the employee not being able to perform work), recordable case rate (e.g., RCR, work related injury or illness requiring attention beyond first aid), or most any other factor that relates to the safety performance of a product, machine, organization, and so forth. The financial sustainability factors can include utilities cost (e.g., energy demand, demand charges, etc.), marketing appeal (e.g., package design A tested better than package design B and is expected to be more profitable), or most any financial measurement impacting the cost or profitability of a product or process. Returning to a prior example, the sustainability search component 102 can query the targets 106 for motors costing less than or equal to $5000 (e.g., search criteria), and that were manufactured without child labor (e.g., human sustainability factor). The sustainability search component 102 obtains, retrieves, or otherwise acquires one or more results that satisfy one or more of the search criteria (e.g., motors, >=$5000), and sustainability factors (e.g., no child labor).

In addition, the sustainability search component 102 can analyze the resulting data elements (e.g., results). For example, the analysis can include locating a predetermined sustainability score contained in or associated with a data element. Additionally or alternatively, the sustainability search component 102 can determine the sustainability score based on one or more associated sustainability factors. Users can assign weights or prioritization values to the sustainability factors based on their personal or business preferences. For example, some users value human sustainability factors more than planet sustainability factors and others may place the most emphasis on a particular sustainability factor such as energy consumption. Furthermore, the sustainability search component 102 can rank the results based on their sustainability scores (discussed infra). The sustainability search component 102 can also base the results ranking on additional factors, such as relevance, user preferences, and so forth. It is to be appreciated that a user can be a human being, or an application or process (e.g., external or integrated).

Most any of the targets 106, such as the controller 106*a*, network device 106*b*, data store 106*c*, or website 106*d* can be initially responsible for measuring or acquiring measurements for the sustainability factors. As used herein, the term controller or PLC can include functionality that can be shared across multiple components, systems, or networks. For example, one or more controllers 106a can communicate and cooperate with various network devices 106b via the communication link 104. This can include substantially any type of control, communications module, computer, I/O device, sensors, Human Machine Interface (HMI) that communicate via the network that includes control, automation, or public networks. The controller 106a can also communicate to and control various other devices such as Input/output modules including Analog, Digital, Programmed/Intelligent I/O modules, other programmable controllers, communications modules, sensors, output devices, and the like. It is to be appreciated that the foregoing example is illustrated for brevity and clarity of explanation; a plurality of additional embodiments may be possible within the scope and spirit of the subject innovation.

Figure 2:
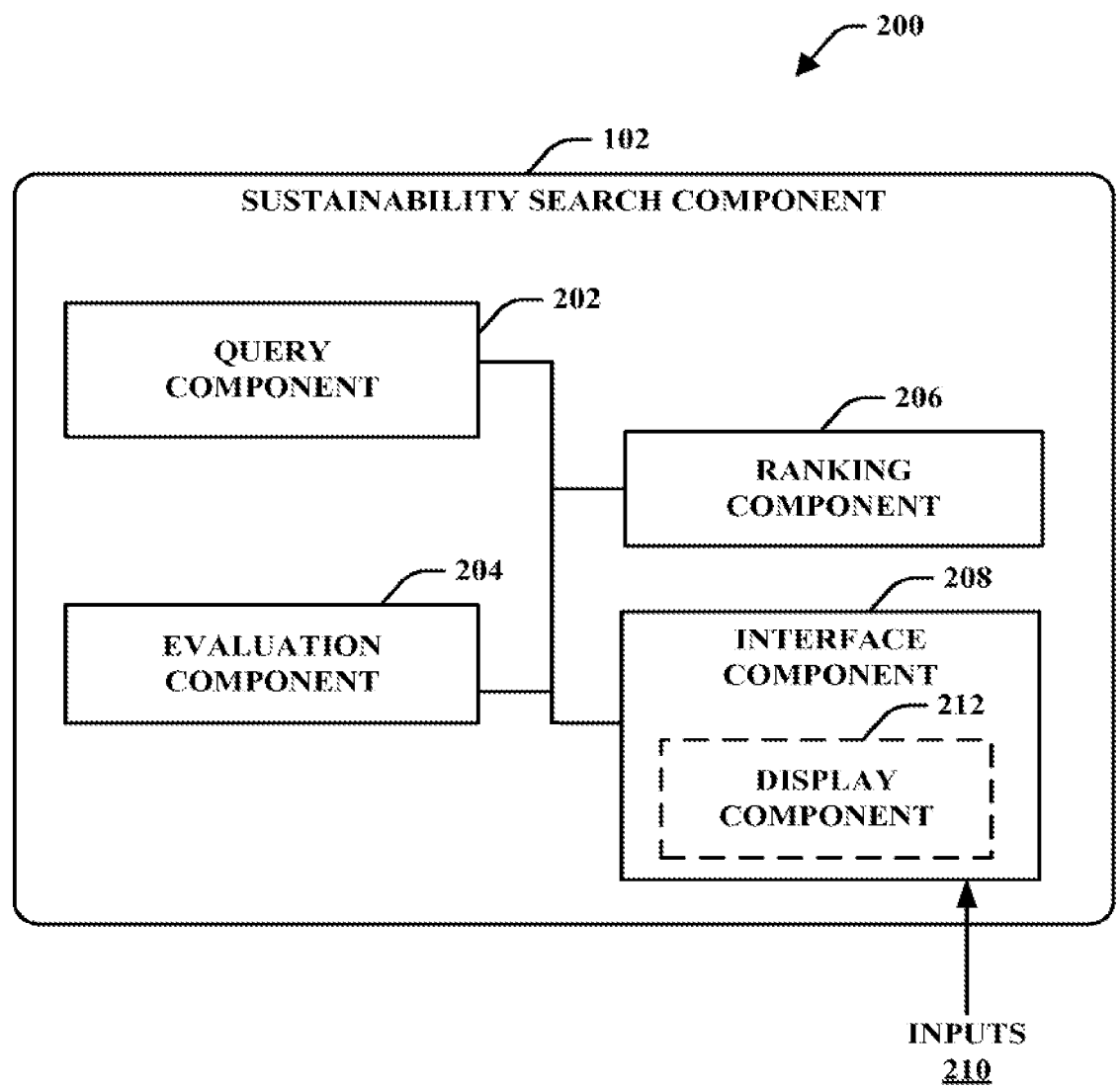
FIG. 2 is an example general component block diagram illustrating an example sustainability search component in accordance with an aspect of the present specification.

FIG. 2 illustrates an example sustainability search component 102 in accordance with an aspect of the subject innovation. The sustainability search component 102 includes a query component 202, an evaluation component 204, and a ranking component 206. The query component 202 searches, scans or otherwise inspects one or more targets for data elements satisfying a set of search criteria and sustainability factors. Data elements can include virtually all data types, such as product or process identifiers having one or more tags (e.g., metadata, notations, etc.) relating to the search criteria and/or sustainability factors. Additionally or alternatively, the data elements can include websites, articles, database entries, bills of materials (B.O.M.), specifications, computer readable instructions, and most any data capable of conveying or communicating relevant information regarding an object or set of objects for which a query is being executed (e.g., query object). The search criteria can include words (e.g., keywords), parts of words, acronyms, and so forth that identify one or more query objects. For example, the search criteria can include products, processes, etc. In addition, the search criteria can include one or more properties of the query object, including but not limited to manufacturer, cost, life cycle, etc. As mentioned above, sustainability factors are metrics that assess alternative cost measures for the query objects. For example, the sustainability factors can include a sustainability score, a set of planet sustainability factors, a set of human sustainability factors, and/or a set of financial sustainability factors.

The evaluation component 204 examines, rates, or otherwise analyzes the data elements and associated tags obtained by the query component 202. Analysis of the data elements can include determining sustainability scores for the data elements. The sustainability scores can be predetermined values that are associated with the data elements. For example, a query can return a data element for the product Y, where the product Y has a predetermined sustainability score of X. Additionally or alternatively, the evaluation component can determine the sustainability score for the data elements by weighting one or more sustainability factors of the data elements. For instance, users of the system 200 may have different sustainability needs, and therefore can assign (discussed infra) different weights to sustainability factors. Continuing with the example, a data element for a bottle of wine may have a plurality of sustainability factors associated with it, including a safety performance score (e.g., human sustainability factor) that has a value ranging for 0 to 10, a water consumption factor (e.g., planet sustainability factor) expressed in the number of gallons used in manufacture of the bottle of wine, and a true or false recyclable packaging factor (e.g., true=1, false=0). A first user may prioritize the human sustainability factor (e.g., safety performance) above the planet sustainability factors (e.g., water consumption, and recyclable packaging), and the first user can assign a weight of thirty (30) to the safety performance factor, a weight of twenty (20) to the water consumption factor, and a weight of ten (10) to the recyclable packaging factor. Therefore, the evaluation component can determine the first user's sustainability score for a bottle of wine using the following equation:

$$SS_1=(30*spf)+(20*wcf)+(10*rpf)$$

where SS is the sustainability score, spf is the safety performance factor, wcf is the water consumption factor, and rpf is the recyclable packaging factor. Conversely, a second user, from a drought prone area, perhaps, can prioritize water consumption above the other factors. For instance, the second user can assign a weight of ten (10) to the safety performance factor, a weight of thirty (30) to the water consumption factor, and a weight of twenty (20) to the recyclable packaging factor. The evaluation component 204 can determine the second user's sustainability score for a bottle of wine using the following equation:

$$SS_2=(10*spf)+(30*wcf)+(20*rpf)$$

The evaluation component 204 can determine different sustainability scores for query objects based on the weighting of one or more sustainability factors. It is to be appreciated the data elements can have additional un-weighted sustainability factors, wherein the evaluation component 204 can assign a default weight to those factors, or not use the factors in determining the sustainability score.

The ranking component 206 organizes the data elements based on the sustainability score determined by the evaluation component. For instance, the ranking component 206 can organize the bottles of wine from the previous example, in a list order from most desirable sustainability score to least desirable sustainability score. In addition, the ranking component 206 can restrict the list to data elements having sustainability scores above or below a threshold, or can restrict the list to a predetermined number of data elements. For example, the ranking component 206 may only include data elements having a sustainability score below (500) on the list, or can restrict the list to the ten (10) data elements having the most desirable sustainability scores. Furthermore, the ranking component 206 can use additional factors in organizing the data elements, including but not limited to relevance, user preferences, and so forth. It is to be appreciated that the ranking component 206 can organize the data elements in a plurality of ways and is not limited to a list. For example, the ranking component 206 can organize the data elements in tables, charts, graphs, matrices, and virtually any manner suitable for conveying the intended information.

The sustainability search component 102 can further include an interface component 208, which provides various adapters, connectors, channels, communication paths, etc. to integrate the sustainability search component 102 into virtually any operating and/or database system(s). In addition, the interface component 208 can provide various adapters, connectors, channels, communication paths, etc., that provide for interaction with the sustainability search component 102. For instance, the interface component 208 can enable interaction with the sustainability search component 102 via a set of inputs 210, where the inputs 210 can include explicit user inputs (e.g., configuration selections, question/answer) such as from mouse selections, keyboard selections, speech, and so forth. The inputs 210 can also include data uploads, wherein a data upload is the transfer of data from the user or a third party source (e.g. computer or a computer readable medium), to the system 200. In particular, the interface component 208 can receive any data relating to search criteria, sustainability factors, sustainability factor weighting, etc.

It is to be appreciated that although the interface component 208 is illustrated as being incorporated into the sustainability search component 102, such implementation is not so limited. For instance, the interface component 208 can be a stand-alone component to receive or transmit data in relation to the sustainability search component 102. In addition, the interface component 208 can include a display component 212 that facilitates displaying search criteria, sustainability factors, sustainability factor weighting, data elements, organization of data elements, and so forth.

Additionally or alternatively, the query results and/or rankings can be communicated, transmitted, or otherwise provided to an external application via a communication network (discussed above). For example, the results and rankings can be provided to an advertising application that obtains the results, and uses the results and ranking to implement a targeted advertising campaign to perspective consumers exhibiting sustainability concerns close to the sustainability scores of the query results. As an additional example, the results and rankings can be provided to a design application that can use the results to enhance or optimize a manufacturing design.

Figure 3:
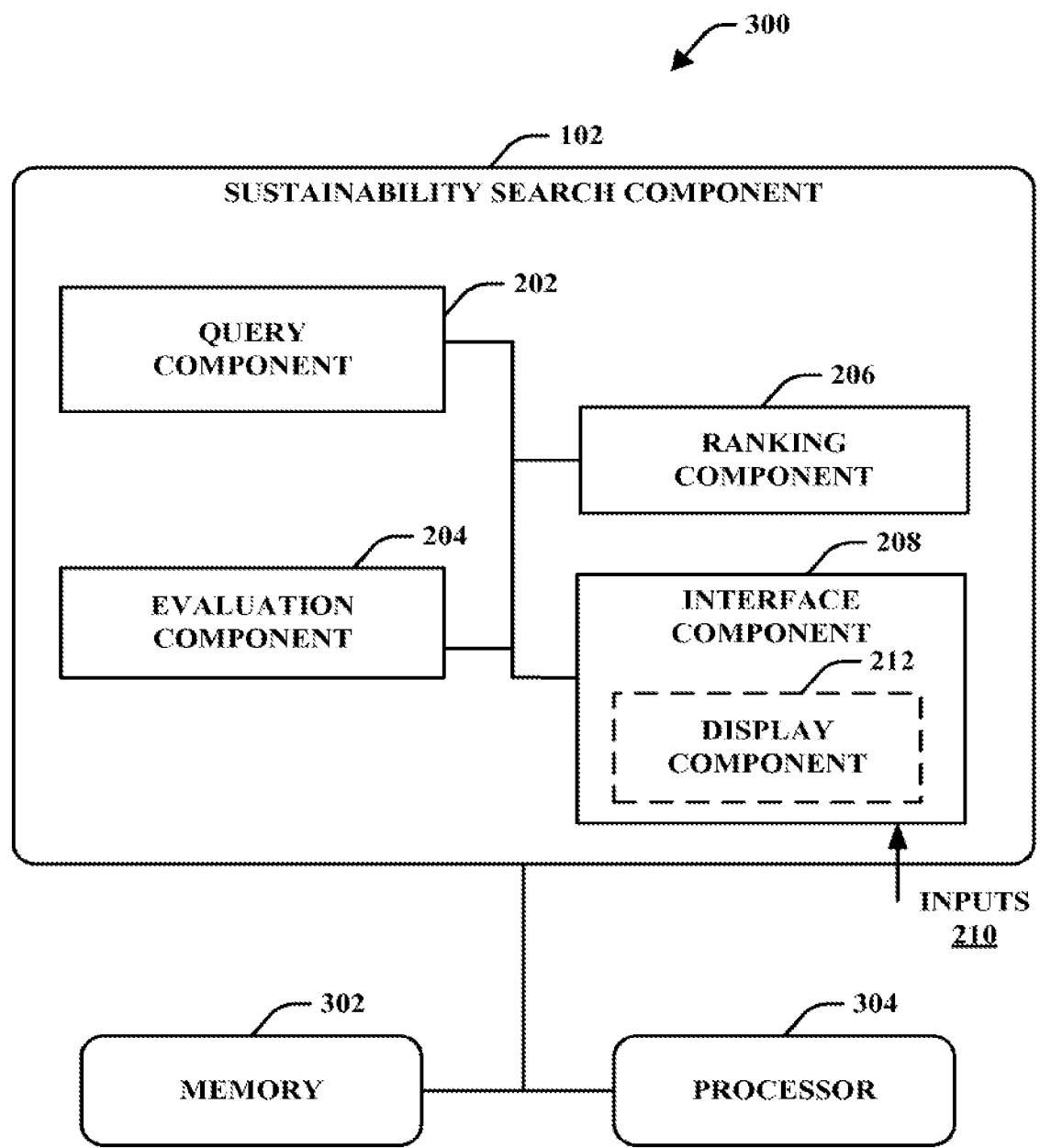
FIG. 3 illustrates an example system facilitating dynamic sustainability search in accordance with an aspect of the present specification.

Turning now to FIG. 3, an example system 300 facilitating dynamic sustainability search is illustrated in accordance with an aspect of the subject innovation. The system 300 includes a sustainability search component 102 that executes a query in one or more targets for data elements satisfying a set of search criteria and sustainability factors. In addition, the sustainability search component 102 can locate a predetermined sustainability score for the data elements, or dynamically determining a sustainability score based on one or more sustainability factors. For instance, a user can assign weight values to one or more sustainability factors, and the sustainability search component can determine the sustainability score factoring in the user defined weight values. Moreover, the data elements can be organized (e.g., ranked) based on the sustainability scores.

System 300 can additionally comprise memory 302 that is operatively coupled to the sustainability search component 102 and that stores search criteria, sustainability factors, weights, user preferences, data elements, and so forth or information related to the data elements, search criteria, sustainability factors, weights, user preferences, and any other suitable information related to facilitating dynamic sustainability searches. A processor 304 can be operatively connected to the sustainability search component 102 (and/or memory 302) to facilitate storing and/or communicating content and the like. It is to be appreciated that processor 304 can be a processor dedicated to executing queries, analyzing results, ranking results and/or interfacing with the sustainability search component, a processor that controls one or more components of system 300, and/or a processor that obtains, analyzes, and ranks results, generates interfaces, and controls one or more components of system 300.

Figure 4:
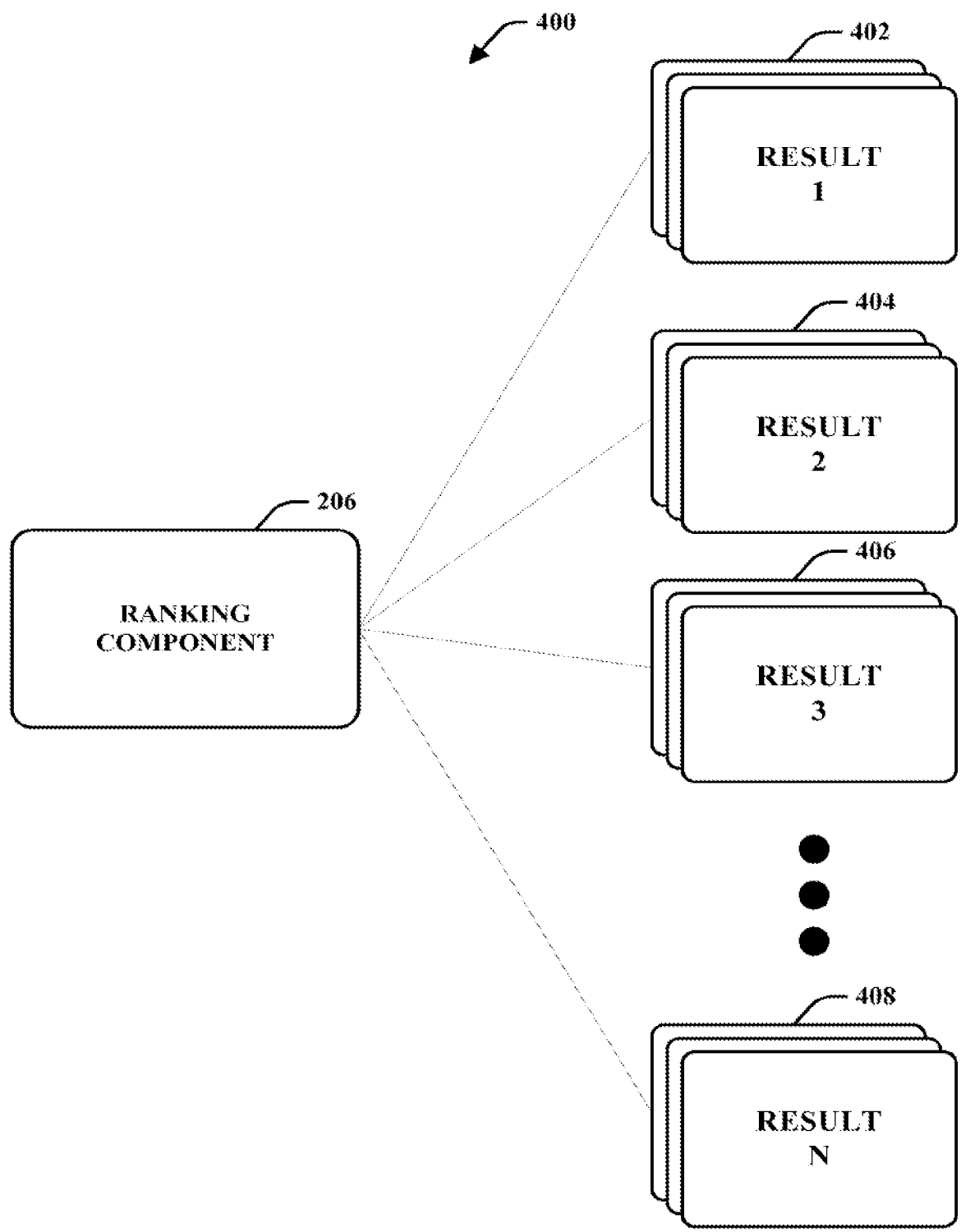
FIG. 4 illustrates an example block diagram of a ranking component in accordance with an aspect of the present specification.

FIG. 4 illustrates an example block diagram of a ranking component 206 in accordance with an aspect of the subject innovation. As previously discussed, the ranking component 206 can order the analyzed data elements (e.g., results) based on sustainability scores and additional factors, such as relevance, user preferences, and so forth. For example, the ranking component 206 can organize N results from lowest sustainability score to highest sustainability score, where N is an integer. For instance, as in a previous example, a sustainability search can be executed for bottles of wine, where a user assigns a weight of ten (10) to a safety performance factor, a weight of thirty (30) to a water consumption factor, and a weight of twenty (20) to a recyclable packaging factor. A first result 402 (e.g., result 1) is for a Chablis having a safety performance factor (e.g., recordable case rate) of 3, a water consumption factor of 20 (e.g., gallons to produce), and a recyclable package factor of 1 (e.g., recyclable). Therefore, the first result 402 has a determined sustainability score of 650 (e.g., 10*3+30*20+20*1). A second result 404 is for a Chardonnay that has a safety performance factor of 1.4, a water consumption factor of 40, and a recyclable package factor of 0 (e.g., not recyclable). Therefore, the second result has a determined sustainability score of 1214 (e.g., 10*1.4+30*40+20*0). A third result 406 (e.g., result 2) is for a Pinot Noir that has a safety performance factor of 4, a water consumption factor of 50, and a recyclable package factor of 0 (e.g., not recyclable). Therefore, the third result has a determined sustainability score of 1540 (e.g., 10*4+30*50+20*0). Similarly, an $N^{th}$ result 408 having a sustainability score greater than the sustainability score of an $N^{th}-1$ result can be ranked as well. It is to be appreciated that this is but a single example, and any number of sustainability factors can be accounted for, and additional factors can be considered by the ranking component as well.

Figure 5:
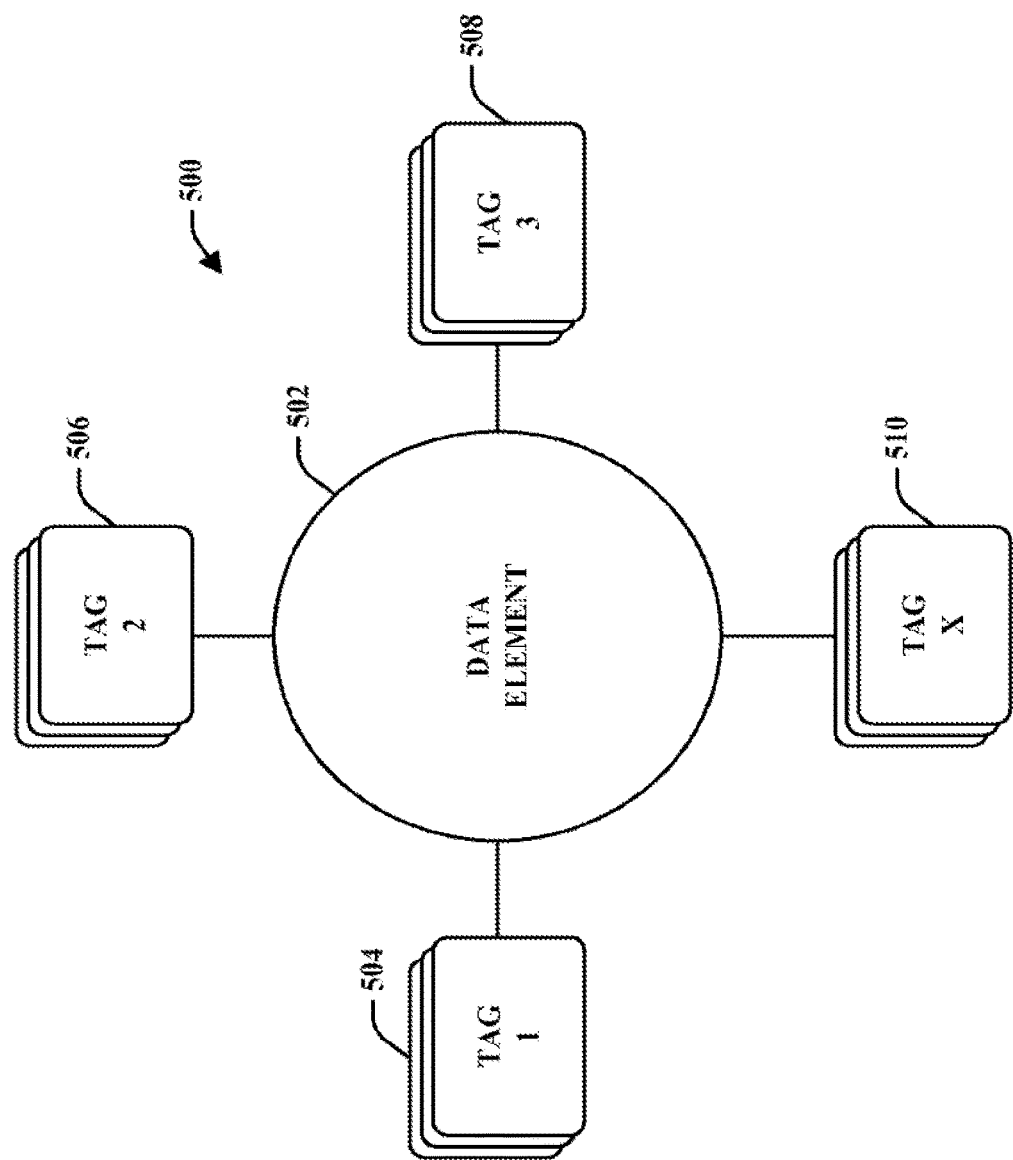
FIG. 5 illustrates an example data element in accordance with an aspect of the present specification.

FIG. 5 illustrates an example data element in accordance with an aspect of the subject innovation. The data element 502 can be most any data type capable of conveying or containing relevant information regarding an object or set of objects for which a query is being executed (e.g., query object). For instance, the data element 502 can include information relating to products, processes, components of manufacturer, and so forth having one or more tags (e.g., 504-510, metadata, notations, etc.) relating to the search criteria and/or sustainability factors. By way of example, and not limitation, the data element 502 can be a three phase motor data element, wherein a first tag 504 (e.g., tag 1) indicates the brand of the motor, a second tag 506 (e.g., tag 2) contains data relating to one or more human sustainability factors, a third tag 508 contains data relating to one or more financial sustainability factors, and a $X^{th}$ tag 510 that can contain virtually any data related to the data element 502, including search criteria and/or sustainability factors. The data element 502 can be retrieved during a sustainability search for "three phase motors", and a sustainability score can be determined based the associated sustainability data (e.g., second tag 506, third tag 508). Additionally or alternatively, the data element 502 can include websites, articles, database entries, bills of materials, computer readable instructions, specifications, and so forth, wherein the associated data (e.g., sustainability factors, search criteria, etc.) can be determined or inferred from the content of the data element 502, as well as any associated tags 504-510.

In additional embodiments, the data element 502 can be a sustainability factor, or sustainability score. For example, a sustainability search can be executed for a product Y in a data store containing a plurality of data associated with product Y. The data element 502 can be retrieved as part of the results of the search, wherein the data element 502 contains a predetermined sustainability score. It is to be appreciated that the foregoing represents but a few examples of possible data structures, and a plurality of additional data structures are possible within the scope and spirit of the subject application.

Figure 6:
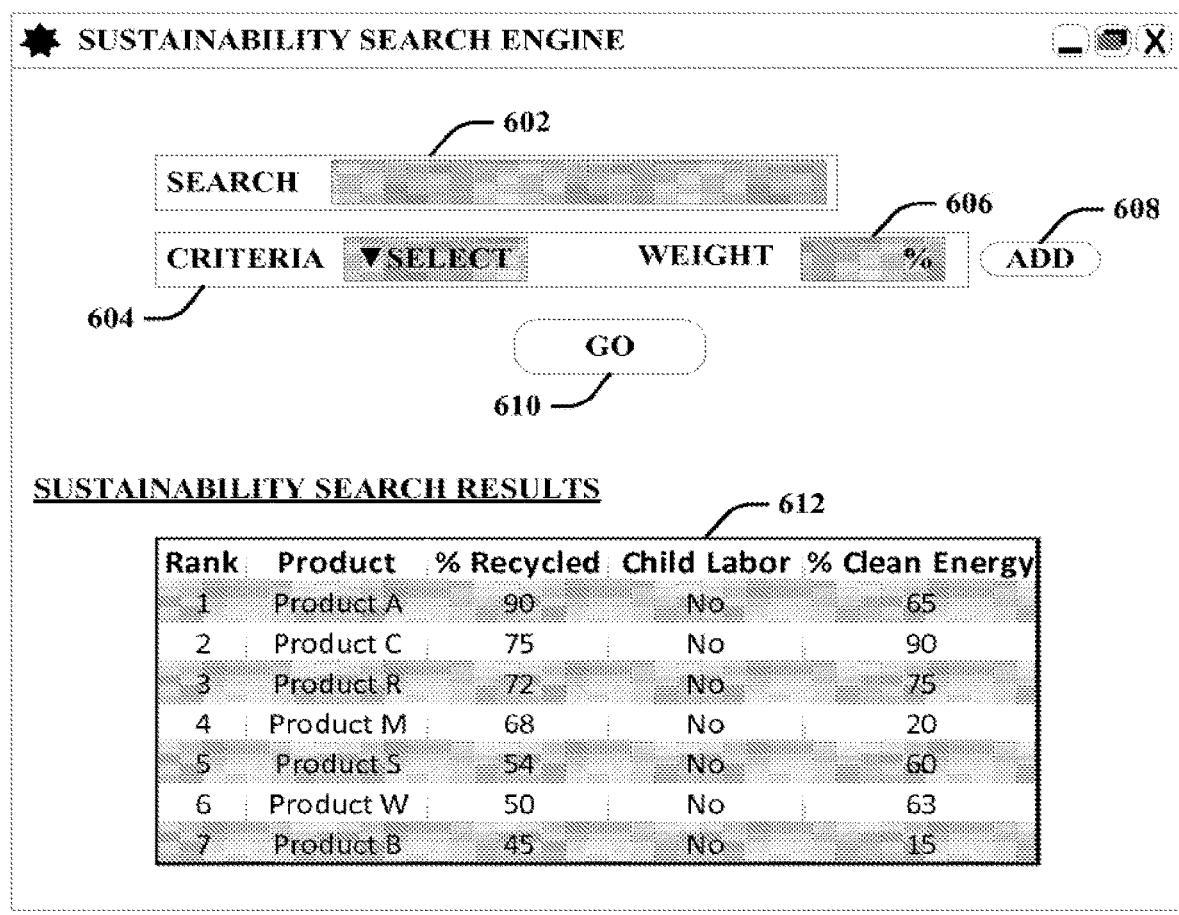
FIG. 6 is an example graphical user interface in accordance with an aspect of the present specification.

Referring to FIG. 6, an example graphical user interface 600 is illustrated in accordance with an aspect of the subject innovation. The graphical user interface (GUI) 600 includes a search field 602. The search field 602 enables users to input one or more search terms. As discussed previously, the search terms can be words, acronyms, parts of words, numbers, letters, and/or symbols that define the object of a query (e.g., product, process, article of manufacture, etc.).

The GUI 600 also includes a criteria field 604 that enables users to input additional search criteria and/or sustainability criteria. For instance, a user may desire to search for a product specified in the search field 602, based on a particular sustainability criteria. The criteria field 604 is illustrated as being a dropdown menu, but the implementation is not so limited, and it could include most any type of input field (e.g., field, text area, etc.). In addition, a weight field 606 associated with the criteria field is provided. As discussed previously, users can assign weights to the sustainability criteria based on their personal preferences, and the sustainability score of a query object can be determined based on the user assigned weights. An add button 608 is provided that allows users to add up to W criteria and associated weight fields, where W is an integer. For example, a user may desire to search for a given product based on five sustainability factors, and the user can add five criteria fields to select the desired sustainability factors.

A go button 610 is provided that users can select when they desire to execute the specified query. As discussed previously, the sustainability search engine executes the specified query against a set of targets, analyses the results, and can rank them based on the sustainability scores. An example set of search results 612 are shown, wherein the results are ranked according to sustainability score, and related sustainability factors (e.g., percentage recycled, child labor, percentage using clean energy) are shown as well.

Figure 7:
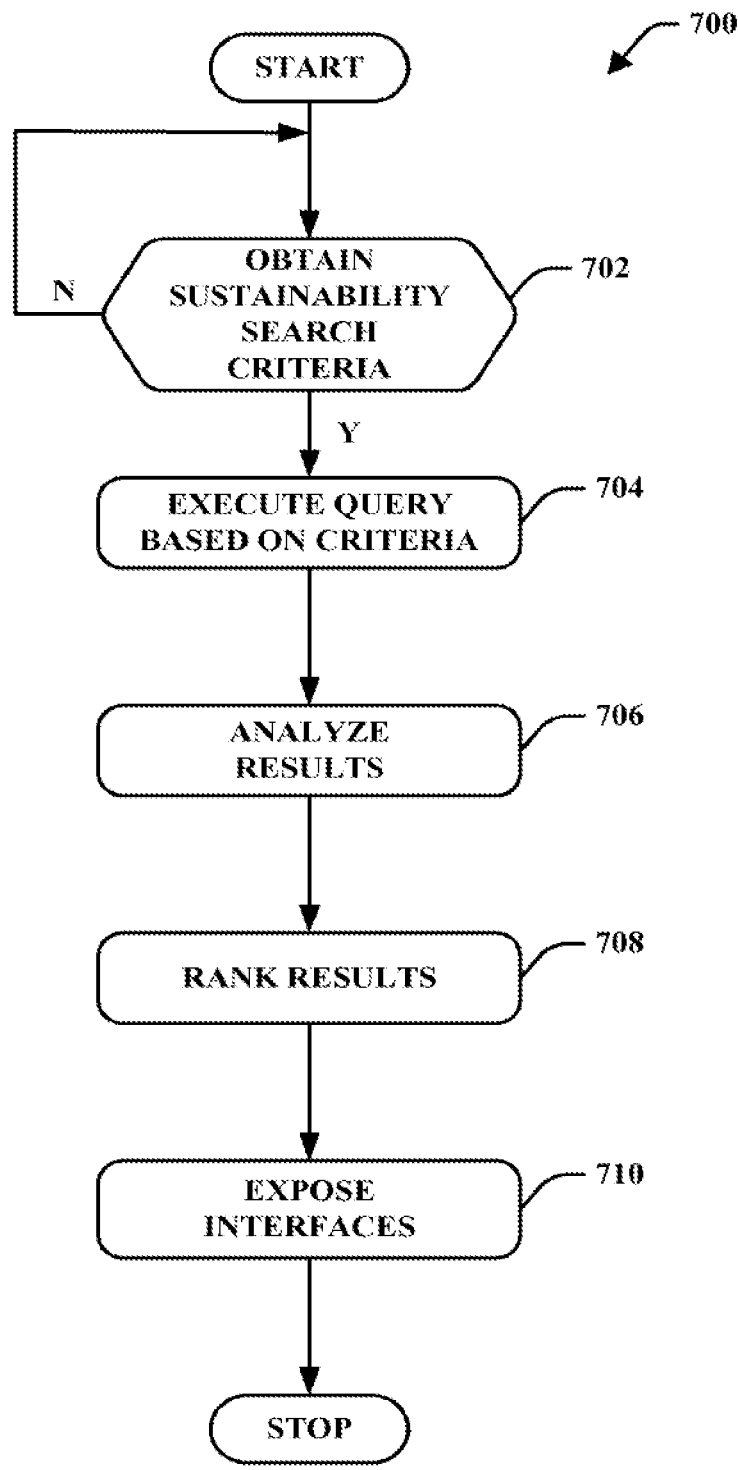
FIG. 7 illustrates an example methodology for dynamic sustainability searches in accordance with an aspect of the present specification.

In view of the example systems described supra, methodologies that may be implemented in accordance with the disclosed subject matter will be better appreciated with reference to the flow chart of FIG. 7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Turning now to FIG. 7, an example methodology for dynamic sustainability searches is illustrated in accordance with an aspect of the present innovation. At 702, a set of search criteria including sustainability factors is obtained. The search criteria can include words (e.g., keywords), parts of words, acronyms, and so forth that identify one or more query objects. For example, the search criteria can include products, processes, articles of manufacturer, etc. In addition, the search criteria can include one or more properties of the query object, including but not limited to manufacturer, cost, life cycle, etc. As mentioned above, sustainability factors are metrics that assess alternative cost measures for the query objects. For example, the sustainability factors can include a sustainability score, a set of planet sustainability factors, a set of human sustainability factors, and/or a set of financial sustainability factors.

At 704, a set of targets are searched, scanned or otherwise queried for one or more data satisfying the search criteria and sustainability factors. The targets can include data stores, controllers, network devices, websites, cloud-based data stores, and so forth. At 706, the results (e.g., data returned from the query) of the query are analyzed. The analysis includes locating a predetermined a sustainability score, or determining a sustainability score based on sustainability factors associated with the results. As discussed previously, users can assign weights or prioritization values to one or more sustainability factors, and the sustainability score can be calculated based on the user assigned weights.

At 708, the results are organized, ordered, or otherwise ranked according to their sustainability scores. For example, the results can be ranked from lowest sustainability score (e.g., more desirable) to highest sustainability score (e.g., least desirable). In addition, the rankings can be restricted to the results having sustainability scores below a threshold. At 710, one or more interfaces can be exposed to display the search criteria, sustainability criteria, weights, results, sustainability scores, rankings, or any combination thereof. Additionally or alternatively, the results can be transmitted, sent or otherwise communicated to another application or process. For example, an advertising application can obtain the results, and use them to provide targeted advertising services.

Figure 8:
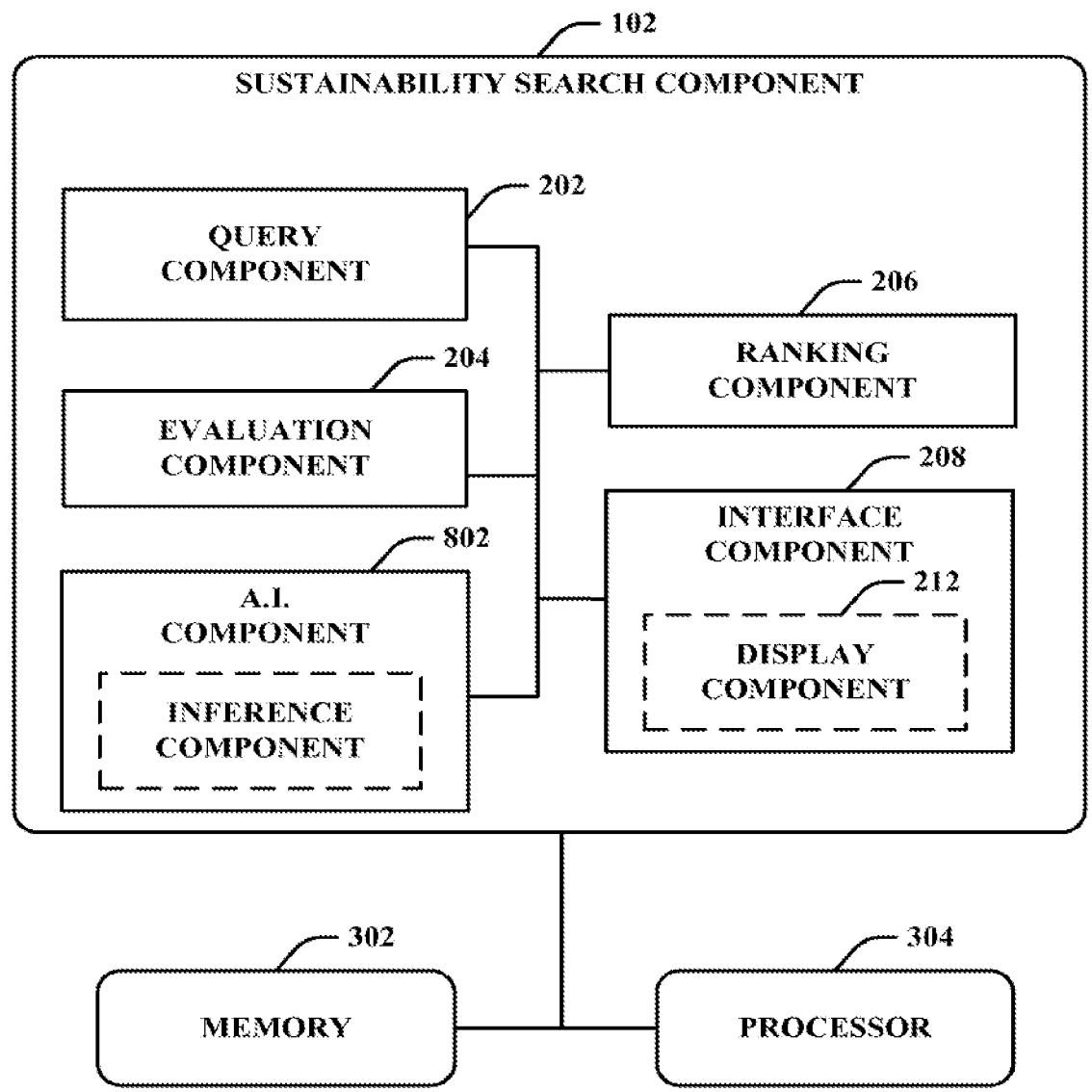
FIG. 8 illustrates a system that employs an artificial intelligence component which facilitates automating one or more features in accordance with the subject specification.

FIG. 8 illustrates a system 800 that employs an artificial intelligence (AI) component 802 which facilitates automating one or more features in accordance with the subject innovation. The subject innovation (e.g., in connection with inferring) can employ various AI-based schemes for carrying out various aspects thereof. For example, a process for weighting sustainability factors, determining a set of targets, analyzing search results, or ranking search results can be facilitated via an automatic classifier system and process.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions there from. For instance, by observing that one user interacts with a subset of other users over a network, it may be determined or inferred that this subset of users belongs to a desired social network of interest for the one user as opposed to a plurality of other users who are never or rarely interacted with.

Directed and undirected model classification approaches including, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 9:
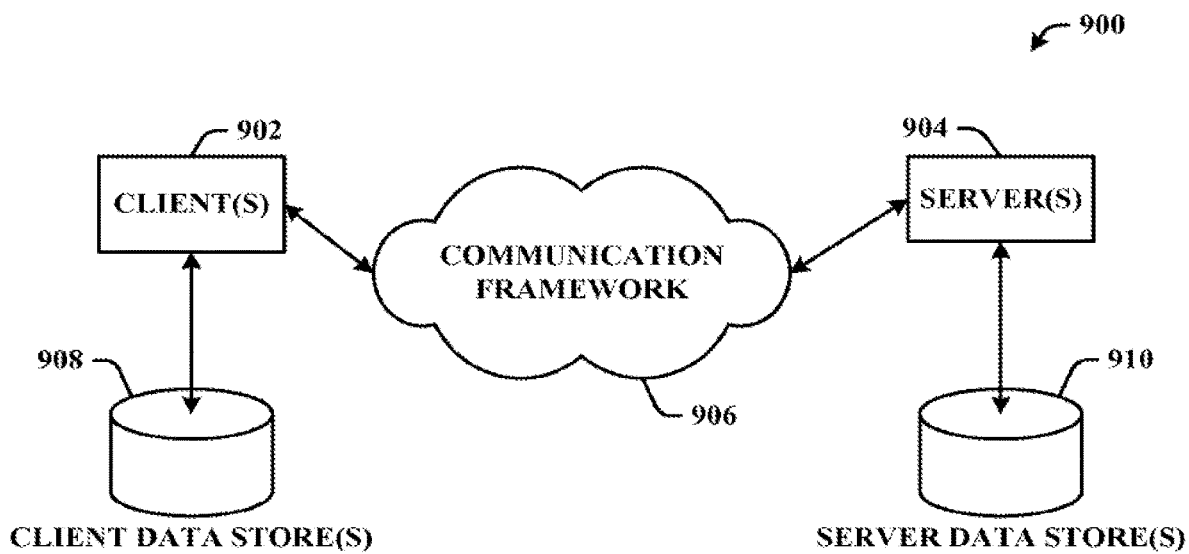
FIG. 9 is a schematic block diagram of a sample-computing environment with which the subject specification can interact.

Referring now to FIG. 9, there is illustrated a schematic block diagram of an example computing environment 900 in accordance with the subject innovation. The system 900 includes one or more client(s) 902. The client(s) 902 can be hardware and/or software (e.g., threads, processes, computing devices). The client(s) 902 can house cookie(s) and/or associated contextual information by employing the innovation, for example.

The system 900 also includes one or more server(s) 904. The server(s) 904 can also be hardware and/or software (e.g., threads, processes, computing devices). The servers 904 can house threads to perform transformations by employing the innovation, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A supply chain management system, comprising:
a set of industrial controllers comprising data associated with a plurality of industrial processes, wherein the plurality of industrial processes is configured to produce a plurality of products; and
an electronic device configured to communicatively couple to the set of industrial controllers, wherein the electronic device comprises an interface device configured to enable a user to interact with the electronic device, a processor, and a memory, and wherein the memory comprises instructions that, when executed, cause the processor to:
receive, via the interface device, a dynamic search request comprising:
a type of product;
a set of sustainability factors, wherein the set of sustainability factors comprises at least one of an environmental impact or a socio-environmental impact associated with a respective industrial process of the plurality of industrial processes; and
a set of weights, wherein each weight of the set of weights is associated with a sustainability factor of the set of sustainability factors;
receive, from the set of industrial controllers, a set of data elements associated with the plurality of industrial processes, wherein each respective data element is associated with a respective industrial controller of the set of industrial controllers;
generate, in an artificial intelligence component, a sustainability ranking for each industrial process of a portion of the plurality of industrial processes based on the set of data elements, wherein the artificial intelligence component is configured to:
automatically determine a portion of the set of industrial controllers that is associated with the portion of the plurality of industrial processes based on the set of data elements, wherein the portion of the plurality of industrial processes is configured to produce a first product of the plurality of products that corresponds to the type of product;
automatically generate a sustainability score for each data element of a portion of the set of data elements that corresponds to the portion of the plurality of industrial processes based on the set of sustainability factors and the set of weights;
automatically generate the sustainability ranking based on the sustainability score of the respective data element and training data representative of observed behavior of the user over time; and
display, via the interface device, the sustainability ranking for each industrial process of the portion of the plurality of industrial processes.

2. The supply chain management system of claim 1, wherein the artificial intelligence component is configured to:
receive a second set of data elements from the set of industrial controllers, wherein the second set of data elements comprises at least one update; and
update the sustainability ranking based on the second set of data elements.

3. The supply chain management system of claim 2, wherein the artificial intelligence component is configured to update the portion of the set of industrial controllers based on the second set of data elements.

4. The supply chain management system of claim 1, wherein determining the portion of the set of industrial controllers comprise employing an automatic classifier system, that comprises a naive Bayes model, a Bayesian network, a decision tree, a neural network, a fuzzy logic model or a probabilistic classification model, and wherein training data for the automatic classifier system comprises the set of data elements.

5. The supply chain management system of claim 4, comprising a data store configured to store the training data.

6. The supply chain management system of claim 1, wherein the artificial intelligence component is configured to adjust the set of weights based on the set of data elements.

7. The supply chain management system of claim 1, wherein the electronic device is coupled to the interface device and to at least one industrial controller via a cloud network.

8. A non-transitory, computer-readable medium device comprising instructions that, when executed, are configured to cause a processor to:
receive, via an interface device coupled to the processor, a dynamic search request comprising:
a type of product;
a set of sustainability factors, wherein the set of sustainability factors comprises at least one of an environmental impact or a socio-environmental impact associated with a respective industrial process of a plurality of industrial processes configured to produce a plurality of products; and
a set of weights, wherein each weight of the set of weights is associated with a sustainability factor of the set of sustainability factors;
receive, from a set of industrial controllers communicatively coupled to the processor through a network, a set of data elements associated with the plurality of industrial processes, wherein each respective data element is associated with a respective industrial controller of the set of industrial controllers;
generate, in an artificial intelligence component, a sustainability ranking for each industrial process of a portion of the plurality of industrial processes based on the set of data elements, wherein the artificial intelligence component is configured to:
automatically determine a portion of the set of industrial controllers that is associated with the portion of the plurality of industrial processes based on the set of data elements, wherein the portion of the plurality of industrial processes is configured to produce a first product of the plurality of products that corresponds to the type of product;
automatically generate a sustainability score for each data element of a portion of the set of data elements that corresponds to the portion of the plurality of industrial processes based on the set of sustainability factors and the set of weights;
automatically generate the sustainability ranking based on the sustainability score of the respective data element and training data representative of observed behavior of a user over time; and
display, via the interface device, the sustainability ranking for each industrial process of the portion of the plurality of industrial processes.

9. The computer-readable medium device of claim 8, wherein the artificial intelligence component is configured to:
receive a second set of data elements from the set of industrial controllers, wherein the second set of data elements comprises a change to at least one data element of the first set of data elements; and
update the sustainability ranking based on the second set of data elements.

10. The computer-readable medium device of claim 9, wherein the artificial intelligence component is configured to update the portion of the set of industrial controllers based on the second set of data elements.

11. The computer-readable medium device of claim 8, wherein determining the portion of the set of industrial controllers comprise employing an automatic classifier system, that comprises a naive Bayes model, a Bayesian network, a decision tree, a neural network, a fuzzy logic model or a probabilistic classification model, and wherein training data for the automatic classifier system comprises the set of data elements.

12. The computer-readable medium device of claim 11, comprising a data-store configured to store the training data.

13. The computer-readable medium device of claim 8, wherein the artificial intelligence component is configured to adjust the set of weights based on the set of data elements.

14. The computer-readable medium device of claim 8, wherein the network comprises a cloud network.

15. A supply chain management system comprising:
a display device, and configured to provide a plurality of user interfaces associated with an industrial environment, wherein each user interface is associated with a respective product of a set of products; and
an electronic device coupled to the display device and to a plurality of targets comprising a set of industrial controllers of the industrial environment and a data-store, wherein the electronic device comprises a processor and a memory comprising instructions that, when executed, cause the processor to produce each user interface associated with a respective product by:
retrieving from the data-store, a dynamic search associated with the respective product, wherein the dynamic search comprises:
a set of sustainability factors comprising at least one of an environmental impact or a socio-environmental impact for a respective industrial process configured to produce the respective product; and
a set of weights, wherein each weight of the set of weights is associated with a sustainability factor of the set of sustainability factors;
receiving, from the plurality of targets, a set of data elements, wherein each data element is associated with an industrial controller;
generating, in an artificial intelligence component, a respective sustainability ranking for the respective product, wherein the artificial intelligence component is configured to:
determine a respective subset of industrial controllers of the set of industrial controllers that is associated with the respective product based on the set of data elements;
generate a sustainability score for each data element based on the set of sustainability factors and the set of weights; and
generate the respective sustainability ranking by ranking each industrial controller of the respective subset of industrial controllers based on the sustainability score of associated data elements; and
providing, to the display device, the respective ranking for sustainability.

16. The supply chain management system of claim 15, wherein the artificial intelligence component is configured to include a new product to the set of products by:
receive a second set of data elements from the set of industrial controllers;
update the respective subset of industrial controllers based on the second set of data elements; and
update the sustainability ranking based on the second set of data elements.

17. The supply chain management system of claim 16, wherein determining the respective subset of industrial controllers comprise employing an automatic classifier system, that comprises a naive Bayes model, a Bayesian network, a decision tree, a neural network, a fuzzy logic model or a probabilistic classification model, and wherein training data for the automatic classifier system comprises the set of data elements.

18. The supply chain management system of claim 17, comprising a data store configured to store the training data.

19. The supply chain management system of claim 15, wherein the artificial intelligence component is configured to adjust the set of weights based on the set of data elements.

20. The supply chain management system of claim 15, wherein the electronic device is coupled to the display device and to at least one industrial controller via a cloud network.

* * * * *